(12) United States Patent
Främling et al.

(10) Patent No.: US 11,343,107 B2
(45) Date of Patent: May 24, 2022

(54) SYSTEM FOR METHOD FOR SECURED LOGGING OF EVENTS

(71) Applicant: ControlThings Oy Ab, Porvoo (FI)

(72) Inventors: Kary Främling, Hammars (FI); Kristian Bäckström, Borgå (FI); Jan Nyman, Borgå (FI); Jesper Lökfors, Pernå (FI)

(73) Assignee: CONTROLTHINGS OY AB, Porvoo (FI)

( * ) Notice: Subject to any disclaimer, the term of this patent is extended or adjusted under 35 U.S.C. 154(b) by 306 days.

(21) Appl. No.: 16/395,479

(22) Filed: Apr. 26, 2019

(65) Prior Publication Data

US 2020/0344074 A1  Oct. 29, 2020

(51) Int. Cl.
*H04L 9/32* (2006.01)
*G06F 16/901* (2019.01)
*H04L 9/30* (2006.01)

(52) U.S. Cl.
CPC ........ *H04L 9/3268* (2013.01); *G06F 16/9014* (2019.01); *H04L 9/30* (2013.01); *H04L 9/3242* (2013.01); *H04L 9/3247* (2013.01)

(58) Field of Classification Search
None
See application file for complete search history.

(56) References Cited

U.S. PATENT DOCUMENTS

| 10,536,277 | B1* | 1/2020 | Kruse | ................... | H04L 9/3247 |
| 2015/0188715 | A1* | 7/2015 | Castellucci | ........... | G06F 21/552 |
| | | | | | 713/178 |
| 2016/0134495 | A1 | 5/2016 | Banescu et al. | | |
| 2018/0375750 | A1* | 12/2018 | Moeller | ............. | G06Q 10/0833 |
| 2019/0007393 | A1* | 1/2019 | Waugh | ................... | H04L 9/3239 |
| 2019/0020629 | A1* | 1/2019 | Baird, III | .............. | H04L 9/3236 |
| 2019/0068562 | A1* | 2/2019 | Iyer | ........................ | H04L 9/3213 |
| 2019/0089547 | A1* | 3/2019 | Simplicio, Jr. | ........ | H04W 12/04 |
| 2020/0052903 | A1* | 2/2020 | Lam | ...................... | H04L 9/3218 |
| 2020/0112440 | A1* | 4/2020 | Nakamura | ............ | H04L 9/0891 |

OTHER PUBLICATIONS

Notification of Transmittal of The International Search Report and The Written Opinion of The International Searching Authority, or The Declaration, Application No. PCT/EP2020/061040, dated Jul. 30, 2020, 17 Pages.

* cited by examiner

*Primary Examiner* — Arezoo Sherkat
(74) *Attorney, Agent, or Firm* — Ziegler IP Law Group, LLC

(57) ABSTRACT

A system for secured logging of a second event. The system includes a logging device and a triggering device The triggering device receives an input related to the second event, creates second event message based on received input related to the second event, and receives the first set of data related to first logged event from the logging device. The triggering device further creates a first position-lock data from the first set of data, creates a second append request, and provides the second append request to the logging device. The logging device is configured to verify the second append request. Based on positive verification, the logging device creates a logging device signature over a second log-append-approval, and combines the created logging device signature with the provided second append request to form a second logged event.

28 Claims, 6 Drawing Sheets

SYSTEM FOR METHOD FOR SECURED LOGGING OF EVENTS

TECHNICAL FIELD

The aspects of the disclosed embodiments relate generally to data security technologies; and more specifically, to systems and methods for secured logging of events.

BACKGROUND

Many data security technologies have been developed to safeguard data in data storage systems from unauthorized access, maintain data integrity during storage, and for secured data communication. Typically, data related to an event, such as a computing event or an occurrence of a real-world activity, is recorded chronologically in a data storage system (e.g. a database or a log file) by a computing system, and is generally referred to as logging of events in a sequential order (i.e. a chain).

Typically, there are several problems associated with the conventional techniques that record information of events. For example, the recorded information may be tampered with or deleted. The recorded information of events may also be re-dated, or the time at which the information was recorded may be changed deliberately or inadvertently, which is not desirable. In another example, the sequence of events in a chain may be reorganized. For example, in a data storage system (e.g. a log file) comprising a sequence (or a chain) of ten events, a particular event, such as log event number 5 in a chain of log events may be changed (e.g. deleted, tampered, or reorganized). The tampering of event logs may be done in order to commit fraud that may be a deviation from agreed terms and conditions, actions, or defined rules. Such tampering may occur as a consequence of a technical error, a deliberate hacking attempt on the conventional system, or by a malicious trusted party who has access to edit the event log.

Furthermore, conventional systems that securely record information of events are computationally heavy (i.e. computationally resource intensive). For example, certain blockchain-based systems are considered secure, but are significantly computational and network resource intensive. The problem associated with such systems is that they require distributed consensus, i.e. there has to be a relatively large number of computing terminals which confirm each and every transaction in a chain, which typically requires every transaction to be replicated to every participating computing terminal. Moreover, such confirmation takes time, thereby delaying the authentication and the overall event logging process. Further, reading of data from the chain to validate each transaction may be difficult and at the same time is considered time and resource intensive.

Therefore, in light of the foregoing discussion, there exists a need to overcome the aforementioned drawbacks associated with events logging systems that securely record information of events.

SUMMARY

The aspects of the disclosed embodiments seek to provide a system for secured logging of a second event. The present disclosure also seeks to provide a method for secured logging of a second event. An aim of the present disclosure is to provide a solution that overcomes at least partially the problems encountered in the prior art, and provides an efficient, secured, and tamper-evident logging of events.

In an aspect, an embodiment of the present disclosure provides a system for secured logging of a second event comprising
  a logging device having a logging device private key and a logging device public key and a first set of data related to a first logged event;
  a triggering device having a triggering device private key and a triggering device public key and means to create a second event message;
  wherein
  the triggering device is configured to
    receive an input related to the second event;
    create the second event message based on the received input related to the second event;
    receive the first set of data related to the first logged event from the logging device;
    create a first position-lock data based on the received first set of data;
    create a second append request, the second append request comprising;
      the created second event message;
      the first position-lock data;
      the triggering device public key and
      a triggering device signature over a triggering commit;
    provide the created second append request to the logging device;
  the logging device is configured to verify the second append request and if verification is positive then
    create a logging device signature over a second log-append-approval;
    combine the created logging device signature over the second log-append-approval with the provided second append request to create a second logged event and store a second set of data related to the second logged event.

In another aspect, an embodiment of the present disclosure provides a method for secured logging of a second event comprising
  in a system that comprises a logging device having a logging device private key and a logging device public key and a first set of data related to a first logged event, and a triggering device having a triggering device private key and a triggering device public key:
    receiving, by the triggering device, an input related to the second event;
    creating, by the triggering device, the second event message based on the received input related to the second event;
    receiving, by the triggering device, the first set of data related to the first logged event from the logging device;
    creating, by the triggering device, a first position-lock data based on the received first set of data;
    creating, by the triggering device, a second append request, the second append request comprising
      the created second event message;
      the first position-lock data;
      the triggering device public key and
      a triggering device signature over a triggering commit;
    providing, by the triggering device, the created second append request to the logging device;
    verifying, by the logging device, the second append request and if verification positive then
      creating a logging device signature over a second log-append-approval;

combining the created logging device signature over the second log-append-approval with the provided second append request to create a second logged event;

storing a second set of data related to the second logged event in a chronological order after the stored first logged event; and providing the second logged event to the triggering device as a receipt of a transaction in response to the second append request.

Embodiments of the present disclosure substantially eliminate or at least partially address the aforementioned problems in the prior art, and enables an efficient and secure logging of events by verifying and authenticating event logging requests prior to appending an event logging in a chain of logged events in an unalterable manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
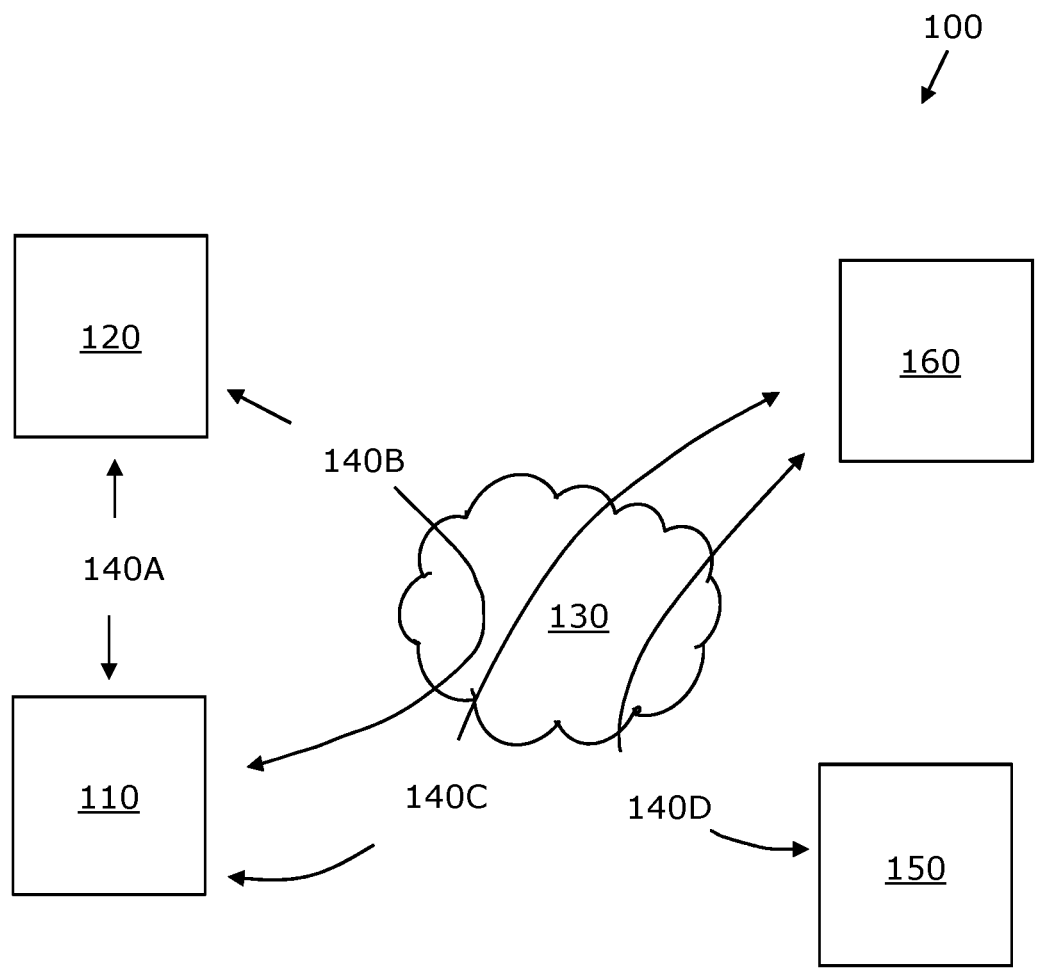
FIG. 1 is a block diagram of a system for secured logging of a second event, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a system for secured logging of a second event comprising a logging device having a logging device private key and a logging device public key and a first set of data related to a first logged event;

a triggering device having a triggering device private key and a triggering device public key and means to create a second event message;

wherein the triggering device is configured to receive an input related to the second event;

create the second event message based on the received input related to the second event;

receive the first set of data related to the first logged event from the logging device;

create a first position-lock data based on the received first set of data;

create a second append request, the second append request comprising;

the created second event message;

the first position-lock data;

the triggering device public key and a triggering device signature over a triggering commit;

provide the created second append request to the logging device;

the logging device is configured to verify the second append request and if verification positive then create a logging device signature over a second log-append-approval;

combine the created logging device signature over the second log-append-approval with the provided second append request to create a second logged event and store a second set of data related to the second logged event.

In another aspect, an embodiment of the present disclosure provides a method for secured logging of a second event comprising in a system that comprises a logging device having a logging device private key and a logging device public key and a first set of data related to a first logged event, and a triggering device having a triggering device private key and a triggering device public key:

receiving, by the triggering device, an input related to the second event;

creating, by the triggering device, the second event message based on the received input related to the second event;

receiving, by the triggering device, the first set of data related to the first logged event from the logging device;

creating, by the triggering device, a first position-lock data based on the received first set of data;

creating, by the triggering device, a second append request, the second append request comprising the created second event message;

the first position-lock data;

the triggering device public key; and a triggering device signature over a triggering commit;

providing, by the triggering device, the created second append request to the logging device;

verifying, by the logging device, the second append request and if verification positive then
    creating a logging device signature over a second log-append-approval;
    combining the created logging device signature over the second log-append-approval with the provided second append request to create a second logged event;
    storing a second set of data related to the second logged event in a chronological order after the stored first logged event; and
    providing the second logged event to the triggering device as a receipt of a transaction in response to the second append request.

The present disclosure provides the aforementioned system, and the aforementioned method for secured logging of events, such as secured logging of a second event after the first event is logged. The system includes a logging device and a triggering device, where the triggering device is configured to generate an append request for a new event and provide the append request to the logging device. The logging device is configured to verify the append request, create a new logged event by combining the provided append request with the logging device signature followed by storage of the newly created logged event (i.e. the second logged event) in a chronological order after the stored first logged event. As the append request includes the position-lock data related to the first logged event, a relationship is established between the first logged event and the second logged event and a chain of logged events is formed. Thus, the disclosed system ensures that the stored data in the chain of logged events cannot be tampered, deleted, re-dated, or re-timed. Moreover, as the logging device functions without the need to communicate and receive any data or any confirmation of the second event from several other computing terminals (other than the triggering device) to approve a new event, the disclosed system is time efficient and computationally light, i.e. operates with limited utilization of computational resources. Furthermore, in case of embedded devices, where there is a hardware design limitation with respect to size, the disclosed system provides a capability even to such small embedded devices to be capable of producing verifiable event logs. Furthermore, the disclosed system requires nominal human intervention, and can be implemented easily.

The system is configured for secured logging of events (i.e. secured logging of a second event once the first event is logged). Throughout the present disclosure the term 'event' as used herein refers to information that is desired to be logged, an occurrence of a real-world activity, an observation, a computing event, authentication related data or a change of state of a process (physical or virtual). In an example, an event may be associated with functions and/or maintenance of a vehicle. In such example, data related to one or more events in the vehicle may be "oil changed 21.1.2019", "new tires installed", "distance driven 23000 km at 22.2.2019, 14:32:23". The logging of events refers to digital recording of the data related to the events. Moreover, secured logging refers to managing data related to each of the events in a manner that each logged event is generated and stored in a controlled environment in an irreversible manner, where information of any given logged event is stored, and is linked with at least another event forming an immutable (or unalterable) chain structure. Specifically, the logged events are stored in a chronological manner and the origin of each log event is verifiable (i.e. verifiable audit trails).

The system comprises a logging device. Throughout the present disclosure, the term 'logging device' as used herein refers to a computing arrangement that is configured to receive, process, and store data related to one or more events. The logging device is an assembly of one or more units (such as a central processing unit, a memory, a display, a communication interface, a system bus, and the like) that enables the communication, processing, and storing of data related to one or more events. Examples of the logging device include, but are not limited to an electronic control unit (ECU) or other module of a vehicle, a flight recorder, a consumer electronic (CE) device, a wearable device, a device of an elevator, a specialized event logging circuitry, or other computing device. Optionally, the logging device is part of a machine. In an embodiment, instead of functioning as an independent machine, the logging device operates as a component of the machine. In an example, the logging device may be a flight recorder itself or a part of a flight recorder of an airplane. In another example, the logging device may be a hardware, a combination of a hardware or a software component of a vehicle. In yet another example, the logging device may be implemented as a part of an in-vehicle infotainment system.

The system comprises the logging device having a logging device private key and a logging device public key and a first set of data related to a first logged event. The logging device private key and the logging device public key is a pair of cryptographic keys, such as asymmetric cryptographic keys pair. Typically, a random number generator is used together with a keypair generating algorithm for generating the asymmetric cryptographic keypair consisting of the public key and the private key. Furthermore, the public key and the private key are sets of data that are used to encrypt and decrypt information. Moreover, the first set of data related to the first logged event refers to data related to a first event that is already logged in the logging device. In an example, data describing the changing of engine oil during a vehicle maintenance performed by a certified service partner may be the first set of data of a first logged event. The data describing the changing of engine oil may be an event related to a first servicing of a vehicle that requires regular maintenance (according to time period and mileage) by the certified service partner, in order to stay in force and have valid engine warranty. In another example, a document including minutes of a meeting for board meeting wherein a new decision of operations of a company, may be the first set of data during a first logged event, such as the meeting for board meeting for the new decision.

The first set of data is stored in the logging device in a manner that the first set of data identifies the first event occurring in a process. For example, the first set of data is stored in the logging device related to a first servicing of the vehicle, which enables identification of the first servicing of the vehicle. In an example, the first set of data may be stored in a log file or a database which in turn may be stored in a memory of the logging device. The first set of data may comprise information about the first logged event stored in a masked form, for example, using one-way hash function. Alternatively, the first set of data comprises the whole first logged event stored in the logging device. Beneficially, the use of the first set of data comprising information in a masked form (using one-way hash function) makes it possible to withhold information about the first logged event, while still allowing the triggering device to create the second append request based on the first set of data. In an example, the first set of data, such as 'oil changed 21. 1. 2019' may be masked to have a structure or value of '39e2aafbf9091670246ab6f900f308e4', in such instance, any other succeeding data, such as "distance driven 23000 km at 22. 2. 2019, 14:32:23" may have a structure or value of '286d03a9ef777ed6d6bb326dac3d8584'.

The system further comprises a triggering device. The triggering device is an electronic device or system that receives, processes, and communicates processed data related to an event, to allow secured recording of logging events. Examples of the triggering device include, but is not limited to a smartphone, a human machine interface (HMI), a handheld device, a consumer electronic device, and other computing device. Optionally, the triggering device may be a part of a machine.

The triggering device has a triggering device private key and a triggering device public key and means to create a second event message. The means to create a second event message refers to an input/output (I/O) device, a physical interface, or a user interface, such as a graphical user interface (GUI). In a case where the means to create a second event message is a GUI, the user interface includes a structured set of user interface elements rendered on the I/O device, such as a display of the triggering device. The user interface elements refer to visual objects that have a size and position in the user interface. In an example, the means to create the second event message is configured to receive an input from a user and provide an output to the user. The input may be a touch input, a voice input, a gesture input, a biometric input, or an auto-generated input (e.g. a sensor output) during an event.

Optionally, the triggering device is a portable terminal and the event logging is done in order to provide a proof of maintenance. In an example, the triggering device is configured to receive an input, such as "oil changed in a vehicle" related to an event, via the portable device (e.g. a smart phone). In such an example the logging device is an electronic control unit of a vehicle and the triggering device is a portable terminal.

In another example, the triggering device may be a portable device connected to a sensor arrangement that is configured to sense filling of oil in a vehicle or the temperature rising above a predefined level in the vehicle. In such example, an event is automatically generated when the oil is filled, or the temperature rises above a predefined level in the vehicle. In such example, the triggering device logs the data related to the filling of the oil, that is received from the sensor arrangement as a part of service agreement for maintenance of a vehicle, and serves as a proof of maintenance. In yet another example, an event may be a command provided by the user using the user interface, such as a button of the user interface displayed in the triggering device. For example, the command may be "start engine", "reset computer", and the like.

According to an embodiment, the triggering device is configured to communicate with the logging device in wired or wireless manner. The triggering device is configured to communicate with the logging device via a data communication network. Such communication may be online communication or an offline communication. Examples of the data communication network includes, but is not limited to a Personal Area Network (PAN), Low-Power Wide-Area Network (LPWAN), Bluetooth®, Bluetooth Low Energy (BLE), light fidelity (Li-Fi), Near-field communication (NFC), Wi-Fi, cellular network, the Internet, or variants thereof.

The triggering device is configured to receive an input related to the second event. Specifically, receiving the input related to the second event is the process of receiving the data related to the second event via the means to create the second event message. For example, the input may be the data related to installation of new tires in a vehicle that may be entered by a user of the vehicle via the means to create the second event message. For example, the user interface of an in-vehicle infotainment system included in the vehicle. Alternatively, the input may be automatically detected, and if considered relevant, may be used as input related to the second event message.

The triggering device is configured to create the second event message based on the received input related to the second event. In an example, the second event message is created in a specified data format. Optionally, the second event message is at least one of: a raw data or a hash of the raw data, wherein the raw data is related to the received input related to the second event. Specifically, the raw data refers to the actual data provided by the user via the means to create the second event message. In an example, the raw data may refer to any data, data subset, or modified data provided by the user via the user interface of the triggering device that describes the second event. The hash of the raw data refers to the masked form of the raw data that is generated using the one-way hash function technique. The hash of the raw data may also be referred to as a digest or a hash code.

In an example, the input related to a second event, provided by the user via the user interface may be "oil changed on 21. 2. 2019". In such instance, the raw data may be "oil changed 21. 2. 2019", and the hash of the raw data may be a fixed length code such as "120abed7b842f9-81f23c275a42e0f25a". Optionally, the hash can be formed of the complete raw data or a part of the raw data. For example, in the event wherein the raw data is "oil changed 21. 2. 2019", the hash may be formed on "oil changed 21. 2. 2019" or on "oil changed". Optionally, the raw data is stored in a database. The database is configured to store the raw data in the form of a table, a map, a grid, a packet, a datagram, a file, a document, a list or in any other form. The database is communicably connected with the logging. In an exemplary embodiment, the database may be located at remote location and the raw data may be stored externally. Beneficially, storing the raw data externally may enable redaction. The word redaction refers to obscuring or censoring raw data throughout this disclosure.

The triggering device is configured to receive the first set of data related to the first logged event from the logging device. The triggering device is configured to acquire the first set of data upon generating a request to the logging device to provide the first set of data related to the first logged event. The device receives the first set of data from the logging device via an online communication channel (e.g. Internet) or an offline short-range communication channel (e.g. Bluetooth or Wi-Fi). In an embodiment, the first set of data provided by the logging device is a hash of the first set of data.

The triggering device is configured to create a first position-lock data based on the received first set of data. Beneficially, the first set of data that is used to create the first position-lock data enables the first logged event to be linked to the second event. In this way, each newly created event will directly have information related to the previous logged event, and indirectly have information related to all of preceding logged events. Specifically, the position-lock data is datum that identifies a position of an event in the chain of logged events. In other words, the position-lock data enables to establish a relation of a new event to a preceding event to form a chain of logged events. The position-lock data enables freezing or locking a position of an event in the chain of logged events.

Optionally, the first position-lock data comprises a hash of a first logged event and the first position-lock data is obtained from the first set of data related to a first logged event provided to the triggering device by the logging device. Optionally, triggering device generates a request to acquire the first set of data related to a first logged event. Thereafter, upon receiving the first set of data a hash of the first set of data is determined using techniques such as one-way hash function. In an example, the hash may be a 256 bit, a 512 bit, or higher bit value to get a virtually unique hash for data related to the first logged event. In an example, the first set of data may be 'oil changed 20. 11. 2018'. In such example, a hash of the data 'oil changed 20. 11. 2018' may be generated such as '39e2aafbf9091670246-ab6f900f308e4' that may be used as a pointer to the first logged event. In an implementation, each logged event is stored separately from each other, for instance as records in a database table with indexed record identifiers for efficient lookup.

The triggering device is configured to create a second append request. Each append request is a form of data structure comprising different information related to a specific event. For example, an information related to an event may be a timestamp that identifies a time of occurrence of an event, namely the second event, such as 'distance driven by a vehicle at 14:32:23 on 22.2.2019 is 23000 km'. The second append request is created with an intent to be used by the logging device to create the second logged event. Optionally, the data related to the second event may be either partial or complete, and include content for the verification of the second append request.

The second append request comprises the created second event message. According to an embodiment, the second event message is at least one of: a raw data or a hash of the raw data, wherein the raw data is related to the received input related to the second event. For example, the raw data may be 'oil changed 21. 2. 2019' and the hash of the raw data may be '120abed7b842f981f23c275a42e0f25a' related to the created second event message. In such instance, the second append request may comprise the "oil changed 21. 2. 2019" and/or '120abed7b842f981f23c275a42e0f25a'.

The second append request further comprises the first position-lock data. The first position-lock data includes complete data or a part of data of the first logged event. In an example, the first position-lock data may comprise a hash of a previously logged first event, such as '39e2aafbf-9091670246ab6f900f308e4'. Moreover, the second append request comprises the triggering device public key. The triggering device public key is a string of data that is used by the triggering device for authentication, authorization and encryption of the second append request. In an example, the triggering device public key may be used to transform the second append request into to a ciphered content that may be un-ciphered by a particular device, namely the logging device.

Furthermore, the second append request comprises a triggering device signature over a triggering commit. In an example, the triggering commit is data comprising the first position-lock and the second event message In another example, the triggering commit is data comprising one-way hash of the first position-lock and one-way hash of the second event message. Optionally, the triggering commit comprises at least one of: the first position-lock data and the second event message, a hash of a data structure comprising the first position-lock data and the second event message, a hash of the first position-lock data and a hash of the second event message, a hash of the first position-lock data and the second event message, and the first position-lock data and a hash of the second event message. In an example, the first position-lock data may be a one-way hash of the first logged event, and the second event message may be 'oil changed 21. 2. 2019'2019'. The hash of the data structure comprising the first position-lock data and the second event message may be '47ac740b4271feaab0559b489b369169'. The hash of the first position-lock data may be '41b39ca78529-23945a69ec33135cdb' and the hash of the second event message may be '6661be74c9d4e6672fafcd81bca'. A hash of the first position-lock data may be '41b39ca7852-923945a69ec33135cdb and the second event message may be 'oil changed 21. 2. 2019'2019'.

The triggering device signature over triggering commit is a digital signature that is a unique digital fingerprint of the triggering device and unique to each signed data. The triggering device signature enables anyone who has access to the triggering device public key, and to the signed data, to verify that the triggering device private key has been used for creating the triggering device signature over triggering commit. Furthermore, the triggering device signature is created by the triggering device over the triggering commit in order to confirm that the second append request was generated by the triggering device (origin), it relates to the specified event data, and the desired position in the chain where the logging device is supposed to add it. In operation, the triggering device creates the triggering device signature spanning over data that is based on the first position-lock and the second event message, as a proof of the triggering device agreeing on the position within the event log where the current append request, namely the second append request is suggested to the logging device to be inserted. Moreover, the triggering device signature provides a proof of event origin and contributes to the tampering detection of the chain of logged events and enables the verification of an order of the events. Beneficially, the triggering device signature provides immutability. In other words, later tampering with the hash or the event message may be verified using the triggering device signature, triggering device public key, and the signed data. Furthermore, the triggering device signature prevents the logging device from inserting the logged event to an incorrect and non-agreed position in the chain of logged events. Beneficially, the inclusion of the second event message as a part of the second append request (compared to alternatively store the second event message externally), as it is signed by the triggering device thereby enables a verification device which has access to the chain to perform verification of the triggering device signature and verification of the chain of logged events.

Optionally, the second append request further comprises a reference to the first logged event provided by the logging device to the triggering device. The reference is a dataset or an indicator that describes or serves as a relation to the first logged event. In other words, the reference to the first logged event included in the second append request is used to describe the relation of the second event with the first logged event. For example, the reference to the first logged event may be 'N' and the second append request may be associated to a second event such as 'N+1'. In such instance, the reference 'X' associated to the first logged event 'N' may be used in the second append request associated with the second event 'N+1' as a proof of relation of the second event 'N+1' with the first logged event 'N'.

Optionally, the second append request further comprises a reference pointer to the raw data. The reference pointer is a datum that indicates or points to the raw data related to the second event so that the raw data is locatable. Optionally, the reference pointer in the second append request is used to access the stored raw data. The reference pointer is used to access the raw data stored in the database. Beneficially, the uses of the reference pointer in the second append request enables redaction and provides privacy and security by avoiding sharing of the actual data of an event, namely the second event. Moreover, the use of such reference pointer reduces the storage capacity requirements of the logging device and enables the functioning of the system using lesser computing resources, as the storage can be handled elsewhere.

Optionally, the second append request further comprises an additional signature over the second event message, and the triggering device public key which is corresponding to the private key that was used to produce the additional signature. In some embodiments, instead of having one signature of the triggering device in the append request, a plurality of signatures may be used. In other words, with the disclosed system there can be an arbitrary number of signatures over the second event message, which are verifiable by the system as a part of a log verification, while having a highly efficient event logging transaction rate. In an example, the plurality of signatures that spans over an event message indicates agreement of multiple users having agreed on the event message, and the triggering device may be considered as a delivery agent who delivers the agreement to the logging device to be logged as a logged chain of events in an immutable log archive.

In another example, a plurality of parties may be involved in an event and individual digital signatures may be necessary to complete the event. The inclusion of the individual digital signatures of each of the plurality of parties infers that each of the plurality of parties agrees to the occurrence of the event. In such example, plurality of digital signatures may be included in the second append request. In such example, such plurality of digital signatures spans over the second event message. In such example, one of the plurality of parties may communicate with each of the plurality of parties and generates the second append request and commutates with the logging device. The system employs two devices for generating signatures that spans over the second event message, such as the triggering device and the logging device. The use of two devices (compared to circulating the append request across more than two devices) enables improved performance of the logging device, as such use of two simultaneously available devices allows minimizing the required time window from serving a first set of data until accepting a new logged event on the logging device when receiving of plurality of incoming append operations at one time at the logging device.

Optionally, the append request comprises at least one of, a certificate issued to the triggering device, a certificate revocation list (CRL), a hash of a certificate revocation list, and a checksum of a certificate revocation list. The certificate issued to the triggering device refers to Digital Signature Certificates (DSC) that include a string of characters, and serves as proof of identity for the triggering device. An example of a certificate may be X.509 certificate. Furthermore, the certificate can be presented electronically to prove the identity of the triggering device. In an example, the certificate may be used by the triggering device for authenticating itself with the logging device. Typically, the certificate is issued by a Certifying Authority that may vary for different geographical regions (e.g. countries). The Certifying Authority may generate a unique serial number associated with the certificate that is to identify the certificate, and this serial number is stored within the certificate.

In an example, the certificate revocation list (CRL) is a list of serial numbers of the certificates which have been revoked by the Certifying Authority. The CRL includes the details of the revocation, such as revocation date, the version of the certificate, issuer name, issue date of the CRL and an update date of the CRL. The serial number within certificate is matched with the list of serial numbers within the CRL, and if the serial numbers of the certificate does not match the serial numbers in the CRL then the certificate is validated, and if the serial numbers of the certificate match the serial numbers in the CRL then the certificate is blacklisted by the Certificate Authority and the second append request is rejected by the logging device. Alternatively, a hash of the CRL is included to mask the actual CRL.

In an example, the certificate revocation list is publicly available on the Internet. Beneficially, to minimize the storage space required for storing the second logged event, only the hash of the then-current version of the CRL is included in second event message. The CRL is authored by a Certificate Authority who has issued a certificate to the triggering device. In other words, the Certificate Authority that issues the certificate for the triggering device is the same Certificate Authority that provides the CRL. Furthermore, the trustworthiness of the triggering device is evaluated based on certificates related to the authentication, the certificates containing the CA signatures, and the CRL from the Certifying Authority can be included in order to achieve later verifiability of proper authentication, and verifiability of the trust anchored to the certificate authority.

Optionally, the second event data is stored in a server system. In an example, the server may be a single hardware server and/or a plurality of hardware servers operating in a parallel or distributed architecture. In another example, the server is implemented as a computer program that provides various services (such as database service) to the triggering device and the logging device.

Optionally, the logged events are stored in a server system. In other words, the logging device stores the logged event such as the first logged event and the first set of data related to a first logged event in the server system. In such instance, the server system may be configured to provide the first set of data related to the first logged event to the triggering device. It will be appreciated that the server system is configured to store raw data related to the event. Beneficially, storing the event data in the server system enables accessing the raw data without using various verification steps. The server system is communicatively coupled with the triggering device and the logging device via the data communication network.

The triggering device is configured to provide the created second append request to the logging device. The triggering device is configured to communicate the created second append request to the logging device via the data communication network. In an example, the created second append request may be communicated via an offline communication channel (e.g. wired connection, Bluetooth, Wi-Fi, and the like) or an online communication channel (e.g. the Internet). In another example the triggering device and the logging device are software modules running on the same computing device, in such an example the data communication occurs over inter process communication.

The logging device is configured to verify the second append request. The logging device is configured to verify whether the received append request, namely the second append request, is produced by the triggering device. Furthermore, the logging device is configured to verify if the second event message included in the second append request is agreed by the signatories, i.e. the logging device determines if the signature(s) in the second append request is valid. Moreover, the logging device is configured to verify if a position to where the second append request is requesting to be inserted refers to the latest logged event, i.e. immediately after the first logged event on the logging device. Beneficially, such verifications are made in order to reject spoofed append requests, tampered append requests and logging attempts to other positions in a chain.

Optionally, the verification is cryptographic verification to verify that the triggering device signature over the triggering commit is authored by a triggering device private key corresponding to the triggering device public key comprised in the second append request.

Optionally, the verification is cryptographic verification to verify that the triggering device signature over the triggering commit spans over the triggering commit. In an example, the triggering device signature may be attached at the starting and the end of the triggering commit in the second append request.

Optionally, the verification is that the triggering commit makes the first position-lock data and the second event message unalterable. In an example, the triggering commit employs one-way hash function technique to mask the first position-lock data and the second event message. In such example, the masked form of the first position-lock data and the second event message is inherently irreversible and cannot be used to obtain the first position-lock data and the second event message. In a case where the first position-lock data or the second event message is tampered with, a recalculation of the triggering commit using the tampered versions of the first position-lock data and the second event message as an input, will not result in an equal triggering commit as the untampered original versions of the first position-lock data and the second event message, thereby using a triggering device signature that spans over the triggering commit, making the first position-lock data and the second event message unalterable.

Optionally, the verification is that the first position-lock data is anchored to the first logged event. In other words, the logging device is configured to identify if the first position-lock data used in the second append request refers to the first logged event. In an example, the logging device determines if the position of event mentioned in the first position-lock data of the second append request refers to the first logged event. In such example, if the first position-lock data used in the second append request does not refer to the first logged event, the verification is considered negative and the second append request is rejected.

Optionally, the verification is a hash provided in the second append request; wherein a hash verification involves recalculation of that hash from the corresponding original data, and verification of the match between the recalculated result and the provided hash. In an example, the logging device is configured to acquire the original data (raw data) related to the second event stored in the server system, and generate the hash from the acquired original data. Subsequently, the logging device is configured to compare the hash generated from the acquired original data with the hash provided in the second append request. Furthermore, upon comparison, if the hashes do not match, then the verification may be considered negative and the second append request may be rejected.

Optionally, the verification is cryptographical verification to verify that a public key associated with a digital signature, which the digital signature according to the second append request spans over the created second event message, has been authored by a private key corresponding to the public key associated with the digital signature. In other words, logging device is configured to analyse if the public key associated with the digital signature matches with a corresponding private key, which has authored the digital signature. If the public key and the private key do not match, then the verification may be considered negative and the second append request may be rejected.

Optionally, the verification is cryptographical verification to verify that a digital signature that according to the second append request is spanning over the second event message, spans over the second event message. In an example, when the second append request indicates that the digital signature is meant for the entire second event message, the logging device applies cryptographic checks to ascertain if such digital signature is actually meant for (or protects) the entire second append request.

Optionally, the verification comprises further checking if a timestamp associated with the second append request received and a local time of the event logging device are within a predetermined time limit. In an example, the time limit may be set to 1 minute. The timestamp of the second append request may be 14:30:00 on 22.2.2019. The local time of the event logging device at which the second append request is received may be 14:30:30. In such instance, the logging device accepts the second append request as valid second event. In another case the second append request is received at 14:31:30. In such case, the verification is considered negative and the second append request may be rejected. The term local time refers to the device's own perception of time (often in UTC), for example based on an internal real-time clock or based on a trusted time server.

Optionally, the system includes a verification device to analyse the generated event logs and to verify that the event log is valid. The verification device remotely connects to the logging device via the data communication network. Optionally, the triggering device may be implemented as the verification device (i.e. the function of the verification device may also be executed by the triggering device).

Optionally, the system includes a subscribing device, which receives the new logged events from the logging device when they are logged. In an example, the subscribing device is a cloud service responsible for storing the chain of logged events. In such an example, the logging device can be an embedded device with limited storage capacity, and the logging device does not store the whole chain of logged events.

Furthermore, if the verification is positive then the logging device is configured to create the logging device signature over the second log-append-approval. In other words, the logging device, after the successful verification approves the second append request and creates the logging device signature for expressing the approval to the chain of logged events. The logging device signature provides a verifiable evidence, with the effect that anyone who has access to a logged event can prove whether that logged event belongs to an event log on the logging device or not. In an example, a logged event may be provided as an independent receipt and proof of logging fulfilment. Erasing logged events from the end of the log on the logging device, thus may be detected, as other devices can carry verifiable proof about the tampering.

In an example, a notary device may be subscribing on the logged events of the logging device, and can detect misbehaviour of logging device when verifying the relation between the latest stored logged event and the new logged event received via the subscription.

Optionally, the logging device is configured to use a logging device private key to create the logging device signature over the second log-append-approval. In an example, a one-way hash of the logging device private key is generated to be used as the logging device signature, which is subsequently used to span over the second log-append-approval. Optionally, the second log-append-approval comprises the triggering device signature over the triggering-commit. In an example, the triggering device signature over the triggering-commit provided in the second append request by the triggering device may be used in the second log-append-approval. Optionally, the second log-append-approval comprises the first position-lock data and the second event message. In an example, the first position-lock data and the second event message provided in the second append request by the triggering device may be used in the second log-append-approval. Optionally, the second log-append-approval comprises a hash of a data structure comprising the first position-lock data and the second event message. In an example, the hash of the data structure comprising the first position-lock data and the second event message provided in the second append request by the triggering device may be used in the second log-append-approval. Optionally, the second log-append-approval comprises a hash of the first position-lock data and a hash of the second event message. Optionally, the second log-append-approval comprises a hash of the first position-lock data and the second event message. In an example, the hash of the first position-lock data and the second event message provided in the second append request by the triggering device may be used in the second log-append-approval. Optionally, the second log-append-approval comprises the first position-lock data and a hash of the second event message.

The logging device is further configured to combine the created logging device signature over the second log-append-approval with the provided second append request to create a second logged event and store a second set of data related to the second logged event. In an example, the logging device stores at least the information required for creating a next logged event (namely, a hash of the second logged event). In an embodiment, the logging device typically stores all logged events. In another embodiment, the logging device selectively stores information related to logged events (i.e. discards excess information or raw data) and other devices, such as the server, may be used for storing of raw data. This minimal storage requirement enables optimum utilization of computational resources, i.e. a storage device, such as a memory, is free to store other data related to other applications. Further, in case of embedded devices, where there is a hardware design limitation with respect to size, the disclosed system provides a capability even to such small embedded devices to be capable of producing verifiable event logs.

Optionally, the logging device is configured to store only the hash of the second set of data and the raw data related to the second logged event is stored in the server system. Furthermore, the logging device is configured to store the second logged event and the second set of data in a manner that the triggering device may use the second logged event and the second set of data to generate a subsequent append request.

Optionally, if the verification is positive, the logging device is further configured to execute a protected action. The logged event can be provided as an independent proof of logging fulfilment. Optionally, erasing logged events from the end or any other section from the event log on the logging device can be detected, as other devices may store verifiable proof about the tampering. For example, the event log file that includes the chain of logged events may be distributed to the triggering device or the server, and may be synched in real time or near real time. The protected action is executed on the logging device or a subscribing device. The protected action is not accessible (or cannot be triggered) by the triggering device without sending an append request (i.e. digitally signing data provided by the logging device). By protecting a feature from having triggered on the logging device without receiving and approving an append request that is related to that feature, it has an enforcing effect that every time the feature is triggered, a logged event is produced. This ensures that every time the feature is triggered, a corresponding logged event exists, which in turn provides verifiability about who (i.e. source) has triggered the event.

In another example, a certain sequence of events needs to be found from the chain of logged events in order to allow the triggering of a feature (i.e. start a paper machine), which otherwise is disabled. The required sequence of events serves as a verifiable launch status checklist, for assuring that the required safety measures have been completed.

Optionally, the logging device is configured to provide the second logged event to the triggering device as a receipt of the transaction. The receipt is the verifiable proof that the logging device accepted the second append request for logging. Furthermore, any subscribing device of the logged events, which has received a logged event signed by the logging device, may use it as a verifiable evidence that the logging device has added and stored the second event. Thus, the receipt of the transaction is advantageous and provides an effect as a verifiable proof (i.e. a tamper-evident feature) that the logging device actually has accepted the append request for logging, in comparison to existing art. In an example, in a case where a particular logged event cannot be found in the chain of logged events, and the coherence of hashes and signatures successfully has been verified, it can be concluded that the chain of logged events has been tampered by erasing events from the end, and the particular logged event (which is now be referred to as orphan logged event) belongs to the erased part. However, as a synched copy of a log file comprising the chain of logged events may also be stored in the server, the chain of logged events in the logging device may be updated. In the disclosed system, as each and every logged event in the chain of logged events is accepted and confirmed by the logging device, with a logging device signature, a non-disputable verifiability is ensured.

Optionally, the second set of data related to the second logged event is added by the logging device, in the chronological order after the stored first logged event to create an unalterable chain of logged events, based on a mutual interaction between the logging device and the triggering device independent of a need to receive any data from a third device. In other words, the logging device stores the second logged event after the first logged event in a manner that any change or alteration in the event once stored can be detected. Moreover, logging device and the triggering device mutually communicate with each other to create the unalterable chain of logged events without requiring any consensus from other computing terminals or any data from any other device, thereby minimizing the time and computational resources required to add an event to the chain without comprising on the security of the system.

In some embodiments, in cases where the append requests, such as the second append request, is declined, for example, due to an inconsistency in the position-lock data, the triggering device is configured to prepare a new append request, based on the same event message (e.g. the second event message). The inconsistency in the position-lock data may be for example, the use of a hash of an old logged event (not the previous logged event) in the second append request. To prepare the new append request, the most recent hash required for the new position-lock in the new append request, may be provided by the logging device to the triggering device together with the information that the previous append attempt was declined.

In an exemplary implementation, an event in a chain of logged events may be related to a shipment tracking event, triggered via a mobile app used by an operator at a logistics company. In such an example, the logging device may be hosted by a cloud service. The mobile app may have required the operator to verify his identity with a third-party Certificate Authority. The mobile app may receive a certificate, which may be included in the logged event. The verifiable shipment tracking information is particularly valuable for trade finance institutions, where letters of credit are matched with shipment. A mobile app for logistics operators is a particularly feasible solution for adopting a large number of small logistic actors in a cost-efficient way.

In an exemplary implementation, an event in the chain of logged events may be related to creation of a document (e.g. using a word processor) that includes minutes of meeting that describes a number of decisions made in a board meeting. Such document may represent a second event message. In such example, after finalizing the editing of the document, the document is circulated among the board members, every board member signs it using their personal private keys for producing respective digital signatures. The signatures are made over the second event message using each board member's private key, and are collected (e.g. as optional signatures for the second event message) by a triggering device associated with the board secretary, who prepares a second append request to a secure folder of previous board meeting minutes (the chain of logged events), stored by a trusted party (e.g. a bank). Moreover, each of the board members and the board secretary may further include their individual public keys (e.g. an individual device public key) with the document (in the second append request)). In this example, the computing device used by the bank may be the logging device. It will be appreciated that the communication between the board secretary and the trusted party is facilitated by secretary who has the triggering device and the logging device respectively.

In the exemplary implementation, the triggering device associated with the board secretary acquires a hash (a first set of data), which can be resembled as an unreadable thumbnail of the first logged event, that refers to the stored latest minutes from the bank. Thereafter, triggering device associated with the board secretary embeds the received hash into the second append request. The board secretary signs, using the triggering device private key, the prepared append request (which now contains both the document, the board member signatures over the document, and the hash of the previous board meeting minutes). In some cases, optionally, specific information related to identifiers (e.g. shelf number and folder number) to locate the previous minutes of meeting (i.e. a reference to previous event), may also be provided in the second append request.

The triggering device associated with the board secretary is used to send the second append request to the bank, who verifies that the signature of the second append request has been authored by the secretary. The bank then compares the hash of the previous board meeting minutes found in the second append request, to verify that it corresponds with the latest stored board meeting minutes found in the bank. If the verification is successful, then the bank stamps the append request as received (creating a logging device signature over the second append request), and appends it to the bank storage, such as a database.

Optionally, the documents (e.g. the files describing the logged events) may be stored separately with full privacy about the decisions made on the meeting in a secure server system. The signatures of secretary and of the bank can be made over one-way hash of the document. The one-way hash is large enough to confirm whether it match with the original document, in case the actual document is available. Optionally, an entity (such as the verifying device which might not have access to the logged data) can access the a second logged event comprising the bank and secretary signatures and a one-way hash of the second event message, and a one-way hash of the whole first logged event, can using the embedded public key verify that the storage of the hash of the second event message is stored in correct position in chain, which by repeating a similar verification for each logged message in chain results in a verification of correct order and completeness (i.e. all documents are available and no minutes of meetings are missing).

In another exemplary implementation, the logging device is a fitness tracker used by a user, and the triggering device is an insurance company cloud service, and the insurance company provides a life insurance to the logging device user. In this example, a redaction feature is used, which means a verification chain contains a hash of data and references to data, but the event data may affect the user's privacy, and thus the data is stored separately in a server system. The insurance company can anytime verify the integrity and coherence of a chain of logged events, as the insurance company has access to the chain of logged events. The user privacy is not affected during normal operation as no event data is made available to the insurance company. In case of an incident, when the user claims insurance compensation, the insurance company can require the user to provide those event data that prove the fulfilment of insurance conditions, and that event data has to match the verification chain which the insurance company can access. In such a case, the user may use the fitness tracker to enable access to the event data via the cloud service. In an example, the insurance company may retain the right to store keep-alive events to the logging device to be logged into the event chain during normal operation. These keep-alive events provide the insurance company with verifiable anchoring of the events to time for future reference, and serves as a mechanism for ensuring that logging device does not retain any new hidden queued messages.

The present disclosure also relates to the method as described above. Various embodiments and variants disclosed above apply mutatis mutandis to the method.

Optionally, the method further comprises utilizing by the logging device, a logging device private key to create the logging device signature over the second log-append-approval, wherein the second log-append-approval comprises at least one of the triggering device signature over the triggering-commit, the first position-lock data and the second event message, a hash of a data structure comprising the first position-lock data and the second event message, a hash of the first position-lock data and a hash of the second event message, a hash of the first position-lock data and the second event message, and the first position-lock data and a hash of the second event message.

Optionally, the method further comprises applying cryptographic verification, by the logging device, to verify that the triggering device signature over the triggering commit is authored by the triggering device private key corresponding to the triggering device public key comprised in the second append request, for the verification of the second append request.

Optionally, the method further comprises applying cryptographic verification, by the logging device, to verify that the triggering device signature over the triggering commit spans over the triggering commit, for the verification of the second append request.

Optionally, the method further comprises verifying, by the logging device, that the triggering commit makes the first position-lock data and the second event message unalterable, in the verification of the second append request.

Optionally, the method further comprises verifying, by the logging device, that the first position-lock data is anchored to the first logged event, in the verification of the second append request.

Optionally, the method further comprises verifying, by the logging device, a hash provided in the second append request; wherein a hash verification involves recalculating a hash from the corresponding original data, and verifying a match between the recalculated result and the provided hash.

Optionally, the method further comprises applying cryptographical verification, by the logging device, to verify that a public key associated with a digital signature, which the digital signature according to the second append request spans over the created second event message, is authored by a private key corresponding to the public key associated with the digital signature, for the verification of the second append request.

Optionally, the method further comprises applying cryptographical verification, by the logging device, to verify that a digital signature which according to the second append request is spanning over the second event message actually spans over the second event message, for the verification of the second append request.

Optionally, the method further comprises checking, by the logging device, if a timestamp associated with the second append request received and a local time of the event logging device are within a predetermined time limit.

Optionally, the method further comprises adding, by the logging device, the second set of data related to the second logged event in the chronological order after the stored first logged event to create an unalterable chain of logged events, based on a mutual interaction between the logging device and the triggering device independent of a need to receive any data from a third device.

Optionally, the method further comprises preparing, by the triggering device, a new append request based on the second event message in response to a decline to the second append request by the logging device, wherein the logging device is configured to communicate decline information that indicates that the second append request is declined, to the triggering device.

DETAILED DESCRIPTION OF THE DRAWINGS

Referring to FIG. 1, there is shown a block diagram of a system 100 for secured logging of a second event, in accordance with an embodiment of the present disclosure. As shown, the system 100 comprises a logging device 110 and a triggering device 120 for secured logging of the second event. The triggering device 120 communicates with the logging device 110 via a communication channel 140A. The communication channel 140A is an offline short-range wired or wireless communication channel. Optionally, the triggering device 120 may communicate with the logging device 110 via a communication channel 140B (i.e. online). The system 100 includes a server 150 to store the logged events. Furthermore, the system 100 includes a verification device 160 that communicates with the logging device 110 via the communication channel 140C. Optionally, the verification device 160 may not be provided and the functions of the verification device 160 may be provided in the triggering device 120. When present, the verification device 160 communicates with the server 150 via the communication channel 140D. Moreover, the communication channel 140B, 140C, and 140D are established in the data communication network 130 for communication.

Figure 2:
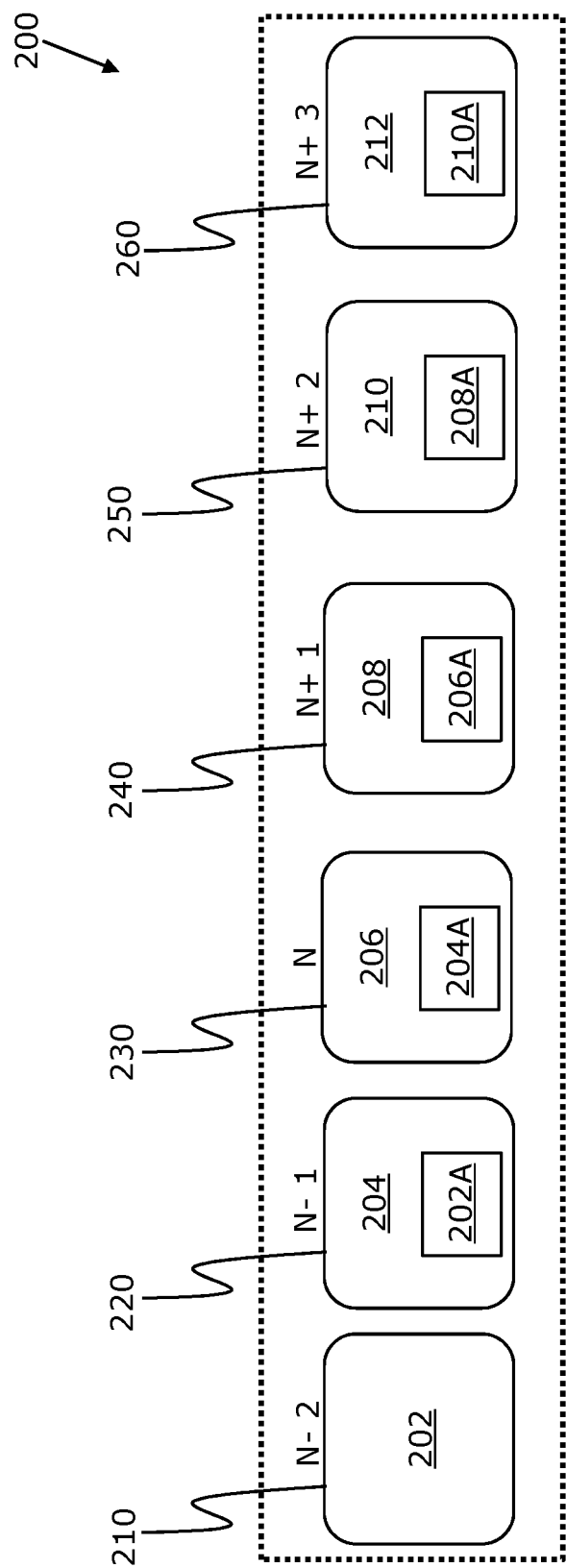
FIG. 2 is an exemplary implementation of the system of FIG. 1, illustrating a chain of logged events, in accordance with an embodiment of the present disclosure.

Referring to FIG. 2, there is shown an exemplary implementation of the system 100 of FIG. 1, illustrating a chain of logged events 200 therein, in accordance with an embodiment of the present disclosure. As shown, the system 100 includes the chain of logged events 200. The chain of logged events 200 includes logged events 210, 220, 230, 240, 250, and 260 arranged in a chronological manner. The logged events 210, 220, 230, 240, 250, and 260 includes event data 202, 204, 206, 208, 210, and 212 respectively. The logged events 220, 230, 240, 250, and 260 includes verification part 202A, 204A, 206A, 208A, and 210A respectively. In such embodiment, a verification part of each logged event (for example, the verification part 206A of the logged event 240) includes partial or the entire event data (i.e. the event data 206) of the previous logged event (such as the logged event 230). Furthermore, in the chain of logged events 200 the logged events 210, 220, 230, 240, 250, and 260 is also represented as N−2, N−1, N, N+1, N+2, N+3 respectively to depict the sequence of logged events in the chain of logged events 200.

Figure 3:
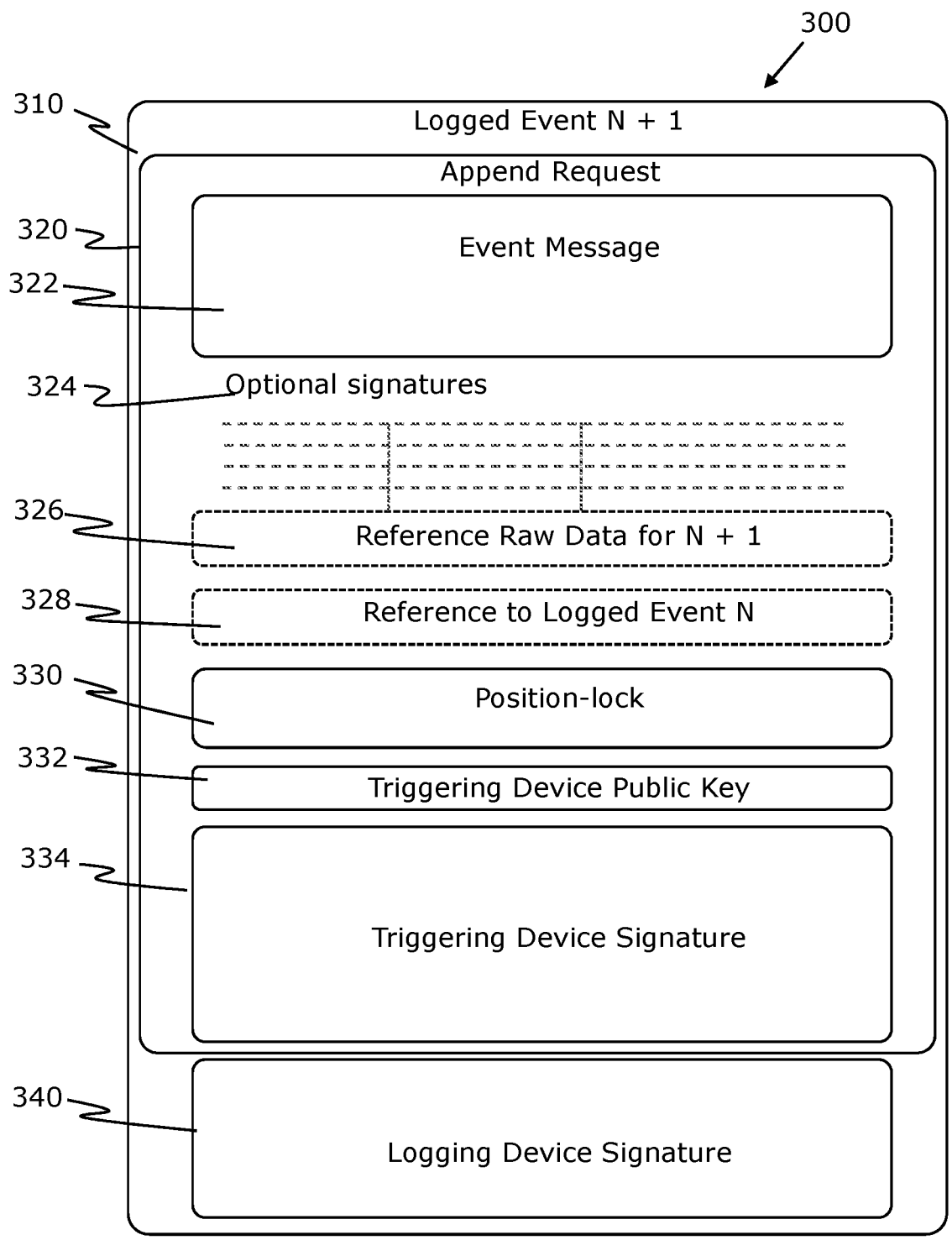
FIG. 3 is an exemplary logged event in an exemplary implementation of the system of FIG. 1, in accordance with an embodiment of the present disclosure.

Referring to FIG. 3, there is shown an exemplary logged event 300 of an exemplary implementation of the system 100 of FIG. 1, in accordance with an embodiment of the present disclosure. The logged event 300 includes an append request 320. The append request 320 includes the event message 322, optional signatures 324, reference raw data 326, reference of the logged event 328, position-lock data 330, triggering device public key 332, triggering device signature 334, logging device signature 340. The logged event 300 is represented as N+1 (i.e. which refers to logged event 240 of FIG. 2).

Figure 4:
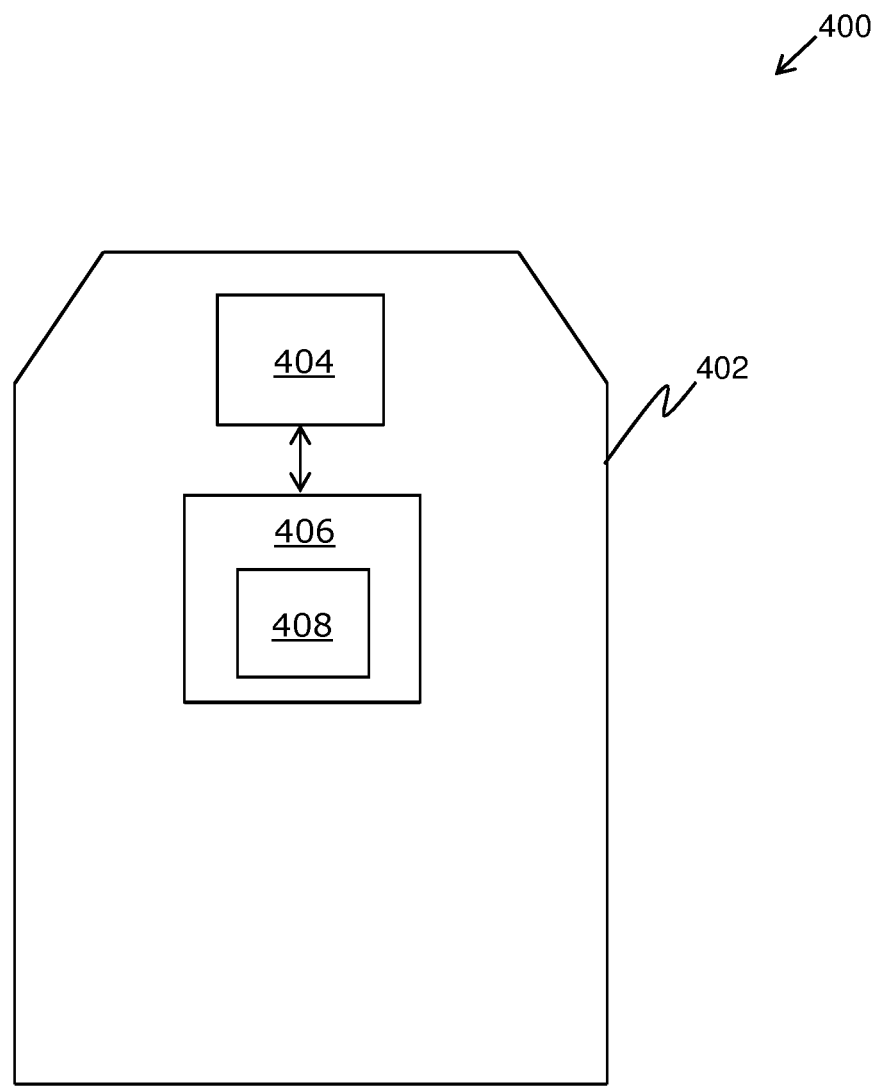
FIG. 4 is a block diagram of an exemplary implementation of the system of FIG. 1, in accordance with an embodiment of the present disclosure.

Referring to FIG. 4, there is shown a block diagram of an exemplary implementation of a system 400, in accordance with an embodiment of the present disclosure. As shown, the system 400 is implemented in a vehicle 402 such as a car. In such instance, the vehicle 402 includes a logging device 404 implemented as an electronic control unit (ECU), and a triggering device 406 implemented as an in-vehicle infotainment system. The triggering device 406 comprises a means 408 to create a second event message. An occupant of the vehicle 402 provides an input related to an event (e.g. a second event) using the means 408 to create a second event message. The logging device 404 stores the logged events.

Figure 5A:
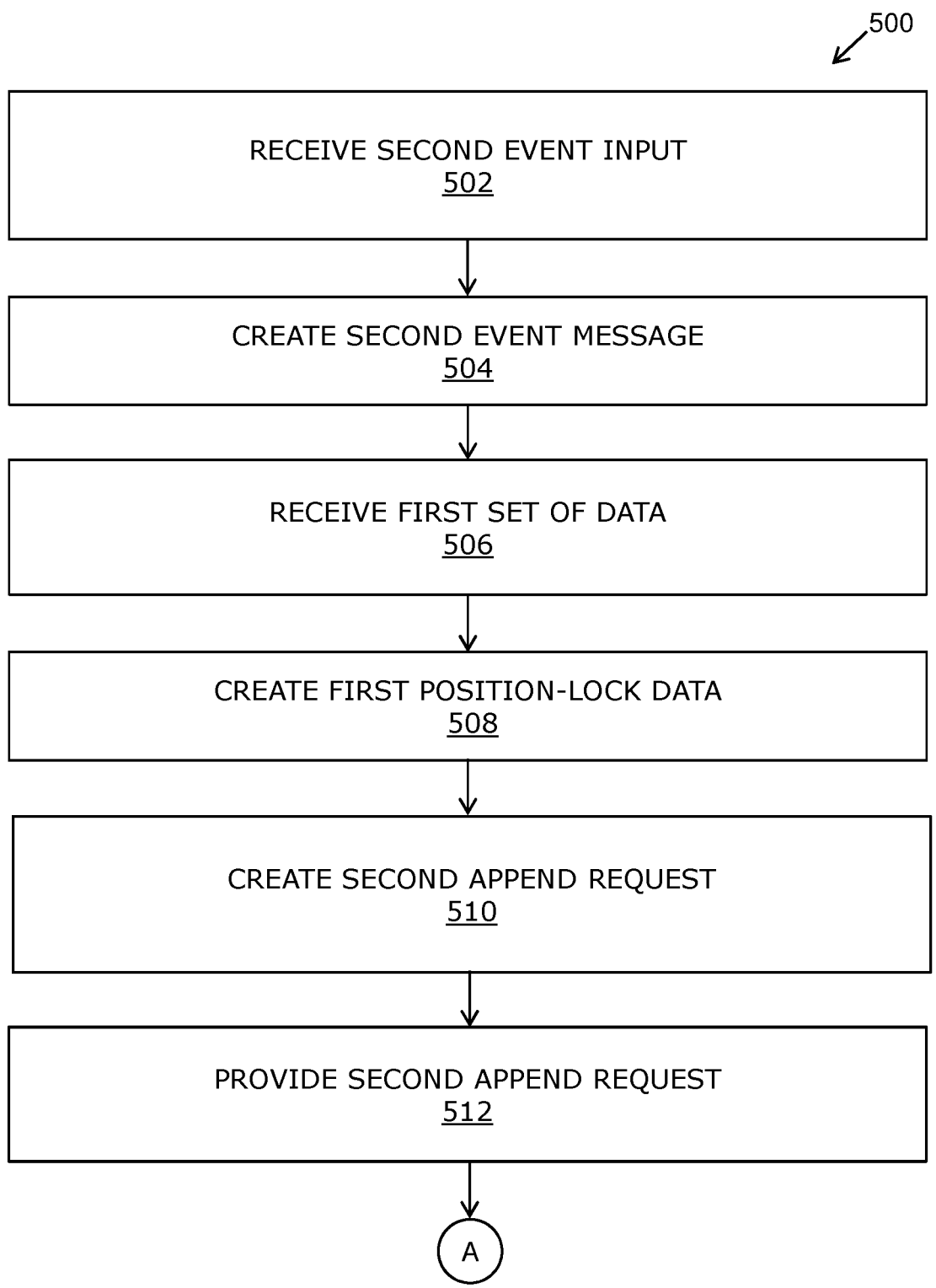
FIGS. 5A and 5B collectively depicts a flow chart of a method for secured logging of a second event, in accordance with an embodiment of the present disclosure.
Figure 5B:
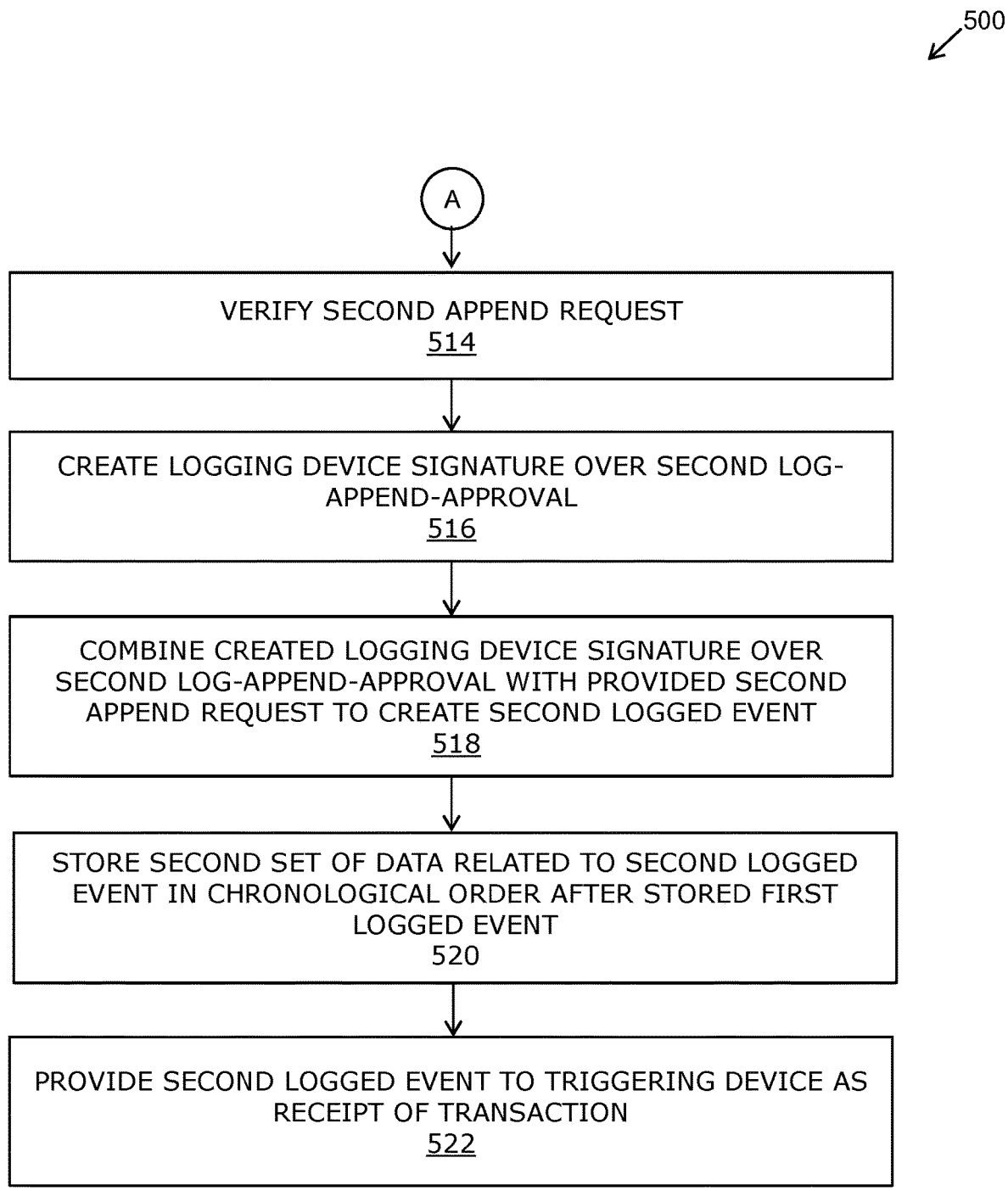

Referring to FIGS. 5A and 5B, there are shown steps of a method 500 for secured logging of a second event, in accordance with an embodiment of the present disclosure. At step 502, an input related to the second event is received by the triggering device. At step 504, the second event message is created based on the received input related to the second event by the triggering device. At step 506, the first set of data related to the first logged event is received from the logging device by the triggering device. At step 508, a first position-lock data is created by the triggering device based on the received first set of data. At step 510, a second append request is created by the triggering device. The second append request comprises the created second event message, the first position-lock data, the triggering device public key, and a triggering device signature over a triggering commit. At step 512, the created second append request is provided to the logging device by the triggering device. At step 514, the second append request is verified by the logging device.

Furthermore, if verification of the second append request is positive then the subsequent steps occurs. At step 516, a logging device signature over a second log-append-approval is created. At step 518, the created logging device signature over the second log-append-approval is combed with the provided second append request to create a second logged event. At step 520, a second set of data related to the second logged event is stored in a chronological order after the stored first logged event. At step 522, the second logged event is provided to the triggering device as a receipt of a transaction in response to the second append request.

Modifications to embodiments of the present disclosure described in the foregoing are possible without departing from the scope of the present disclosure as defined by the accompanying claims. Expressions such as "comprising", "consisting", "incorporating", "have", "is" used to describe and claim the present disclosure are intended to be construed in a non-exclusive manner, namely allowing for items, components or elements not explicitly described also to be present. Expressions such as "may" and "can" are used to indicate optional features, unless indicated otherwise in the foregoing. Reference to the singular is also to be construed to relate to the plural.

The invention claimed is:

1. A system for secured logging of a second event comprising:
   a logging device comprising a logging device private key, a logging device public key and a first set of data related to a first logged event;
   a triggering device comprising a triggering device private key and a triggering device public key,
   wherein the triggering device is configured to
      receive an input related to the second event;
      create a second event message based on the received input related to the second event;
      receive the first set of data related to the first logged event from the logging device;
      create a first position-lock data based on the received first set of data;
      create a second append request; and
      provide the second append request to the logging device;
      wherein the second append request comprises:
         the second event message;
         the first position-lock data;
         the triggering device public key; and
         a triggering device signature over a triggering commit,
   wherein the logging device is configured to
      cryptographically verify the second append request based on the triggering device signature, and
      in response to a verification being positive, create a logging device signature over a second log-append-approval;
      combine the logging device signature over the second log-append-approval with the provided second append request to create a second logged event; and
      store a second set of data related to the second logged event.

2. The system according to claim 1, wherein the second event message is at least one of: a raw data, and a hash of the raw data, wherein the raw data is related to the received input related to the second event.

3. The system according to claim 1, wherein the first position-lock data comprises a hash of the first logged event, and the first position-lock data is obtained from the first set of data related to the first logged event.

4. The system according to claim 1, wherein, the triggering commit comprises at least one of
   the first position-lock data and the second event message,
   a hash of a data structure comprising the first position-lock data and the second event message,
   a hash of the first position-lock data and a hash of the second event message,
   a hash of the first position-lock data and the second event message, and
   the first position-lock data and a hash of the second event message.

5. The system according to claim 1, wherein the logging device is configured to use a logging device private key to create the logging device signature over the second log-append-approval, and wherein the second log-append-approval comprises at least one of
   the triggering device signature over the triggering-commit,
   the first position-lock data and the second event message,
   a hash of a data structure comprising the first position-lock data and the second event message,
   a hash of the first position-lock data and a hash of the second event message,
   a hash of the first position-lock data and the second event message, and
   the first position-lock data and a hash of the second event message.

6. The system according to claim 1, wherein the second append request further comprises a reference to the first logged event.

7. The system according to claim 1, wherein the second append request further comprises a reference pointer to raw data.

8. The system according to claim 7, wherein the raw data is stored in a database and the reference pointer in the second append request is used to access the stored raw data.

9. The system according to claim 1, wherein the logging device is part of a machine and the triggering device is a portable terminal and the event logging is done in order to provide a proof of maintenance.

10. The system according to claim 1, wherein the second append request further comprises one or more additional signatures over the second event message, and one or more public keys, wherein the one or more public keys correspond to one or more private keys paused to produce the one or more additional signatures.

11. The system according to claim 1, where the logging device is configured to provide the second logged event to the triggering device as a receipt of the transaction.

12. The system according to claim 1, wherein, in response to the verification being positive, the logging device is further configured to execute a protected action.

13. The system according to claim 1, wherein an append request comprises at least one of:
   a certificate issued to the triggering device,
   a certificate revocation list,
   a hash of the certificate revocation list, and
   a checksum of the certificate revocation list,
   wherein the certificate revocation list is authored by a certificate authority, wherein the certificate authority issued a certificate to the triggering device.

14. The system according to claim 1, wherein the verification is at least one of:
   a cryptographic verification to verify that the triggering device signature over the triggering commit is authored by a triggering device private key corresponding to the triggering device public key comprised in the second append request;
   a cryptographic verification to verify that the triggering device signature over the triggering commit spans over the triggering commit;
   a verification that the triggering commit makes the first position-lock data and the second event message unalterable;
   a verification that the first position-lock data is anchored to the first logged event;
   a verification of a hash provided in the second append request; wherein a hash verification involves recalculation of that hash from the corresponding original data, and verification of the match between the recalculated result and the provided hash;
   a cryptographical verification to verify that a public key associated with a digital signature, which the digital signature according to the second append request spans over the created second event message, has been authored by a private key corresponding to the public key associated with the digital signature; and
   a cryptographical verification to verify that a digital signature which according to the second append request is spanning over the second event message spans over the second event message.

15. The system according to claim 1, wherein the second append request comprises an append request timestamp, and the verification of the second append request comprises checking whether the append request timestamp is within a predetermined time limit of when the second append request was received by the logging device.

16. The system according to claim 1, wherein the logging device is an electronic control unit of a vehicle and the triggering device is a portable terminal.

17. A method for secured logging of a second event within a system, the system comprising:
   a logging device comprising a logging device private key, a logging device public key and a first set of data related to a first logged event;
   a triggering device comprising a triggering device private key and a triggering device public key,
   the method comprising:
   receiving, by the triggering device, an input related to the second event;
   creating, by the triggering device, a second event message based on the received input related to the second event;
   receiving, by the triggering device, the first set of data related to the first logged event from the logging device;
   creating, by the triggering device, a first position-lock data based on the received first set of data;
   creating, by the triggering device, a second append request; and
   providing, by the triggering device, the second append request to the logging device, the second append request comprises:
   the second event message;
   the first position-lock data;
   the triggering device public key; and
   a triggering device signature over a triggering commit,
   the method further comprises:
   cryptographically verifying, by the logging device, the second append request based on the triggering device signature, and
   in response to a verification being positive, creating, by the logging device, a logging device signature over a second log-append-approval;
   creating a second logged event, by the logging device, by combining the logging device signature over the second log-append-approval with the second append request; and
   storing, by the logging device, a second set of data related to the second logged event in a chronological order after the stored first logged event.

18. The method according to claim 17, further comprising creating, by the logging device, the logging device signature over the second log-append-approval based on the logging device private key, wherein the second log-append-approval comprises at least one of:
   the triggering device signature over the triggering-commit,
   the first position-lock data and the second event message,
   a hash of a data structure comprising the first position-lock data and the second event message,
   a hash of the first position-lock data and a hash of the second event message,
   a hash of the first position-lock data and the second event message, and
   the first position-lock data and a hash of the second event message.

19. The method according to claim 17, further comprising cryptographic verification by the logging device to verify that the triggering device signature over the triggering commit is authored by the triggering device private key corresponding to the triggering device public key.

20. The method according to claim 17, further comprising applying cryptographic verification by the logging device to verify that the triggering device signature over the triggering commit spans over the triggering commit, for the verification of the second append request.

21. The method according to claim 17, further comprising verifying by the logging device that the triggering commit makes the first position-lock data and the second event message unalterable, in the verification of the second append request.

22. The method according to claim 17, further comprising verifying by the logging device that the first position-lock data is anchored to the first logged event, in the verification of the second append request.

23. The method according to claim 17, further comprising verifying by the logging device a first hash provided in the second append request, wherein the verifying the first hast comprises:
   recalculating a hash based on a corresponding original data, and comparing the recalculated hash to the first hash.

24. The method according to claim 17, further comprising applying cryptographical verification, by the logging device, to verify that a public key associated with a digital signature, which the digital signature according to the second append request spans over the created second event message, is authored by a private key corresponding to the public key associated with the digital signature, for the verification of the second append request.

25. The method according to claim 17, further comprising applying cryptographical verification, by the logging device, to verify that a digital signature which according to the second append request is spanning over the second event message actually spans over the second event message, for the verification of the second append request.

26. The method according to claim 17, wherein the second append request comprises an append request timestamp, and the method further comprises checking, by the logging device, whether the append request timestamp is within a pre-determined time limit of a local time of when the second append request was received by the logging device.

27. The method according to claim 17, further comprising adding, by the logging device, the second set of data related to the second logged event in the chronological order after the stored first logged event to create an unalterable chain of logged events, based on a mutual interaction between the logging device and the triggering device independent of a need to receive any data from a third device.

28. The method according to claim 17, further comprising preparing, by the triggering device, a new append request based on the second event message in response to a decline to the second append request by the logging device, wherein the logging device is configured to communicate decline information that indicates that the second append request is declined, to the triggering device.

* * * * *